United States Patent

Broussard, Sr.

[11] Patent Number: 5,300,222
[45] Date of Patent: Apr. 5, 1994

[54] WATER CLARIFICATION METHOD AND APPARATUS

[76] Inventor: Paul C. Broussard, Sr., 209 Constitution Dr., Maurice, La. 70555

[21] Appl. No.: 26,877

[22] Filed: Mar. 8, 1993

Related U.S. Application Data

[63] Continuation-in-part of Ser. No. 965,888, Oct. 23, 1992, which is a continuation of Ser. No. 589,471, Sep. 28, 1990, Pat. No. 5,158,678.

[51] Int. Cl.⁵ .............. B04C 5/14; B04C 9/00; B01D 50/00; B01D 17/035
[52] U.S. Cl. .................... 210/202; 210/207; 210/221.1; 210/221.2; 210/294; 210/256; 210/512.1
[58] Field of Search .......... 210/202, 207, 221.2, 210/221.1, 241, 294, 256, 259, 260, 512.1, 512.2; 209/211

[56] References Cited

U.S. PATENT DOCUMENTS

| | | | |
|---|---|---|---|
| 1,542,666 | 6/1925 | Casablanca | 210/294 |
| 2,765,918 | 10/1956 | Fontein | 209/211 |
| 2,967,618 | 1/1961 | Vane | 210/512.1 |
| 3,010,805 | 11/1961 | Cheng | 210/260 |
| 3,045,828 | 7/1962 | Hume | 210/512.1 |
| 3,698,558 | 10/1972 | Weber | 210/251 |
| 3,708,067 | 1/1973 | Javet | 210/512.2 |
| 3,717,255 | 2/1973 | Rowland | 210/512.2 |
| 3,723,309 | 3/1973 | Garcia | 210/202 |
| 3,959,139 | 5/1976 | El-Hindi | 210/294 |
| 3,960,734 | 6/1976 | Zagorski | 210/512.2 |
| 4,208,270 | 6/1980 | Grieve | 210/512.2 |
| 4,274,968 | 6/1981 | Grutsch | 210/512.1 |
| 4,316,729 | 2/1982 | MacLean | 210/512.1 |
| 4,601,734 | 7/1986 | Meier | 210/512.2 |
| 4,626,345 | 12/1986 | Krofta | 210/530 |
| 4,673,495 | 6/1987 | Carroll | 210/512.2 |
| 4,698,077 | 10/1987 | Peltola | 210/512.2 |
| 4,726,902 | 2/1988 | Hubbard | 210/512.2 |
| 4,728,428 | 3/1988 | Broussard | 210/202 |
| 4,755,295 | 7/1988 | Donhauser | 210/512.2 |
| 4,824,563 | 4/1989 | Iwahori | 210/202 |
| 4,878,924 | 11/1989 | Yano | 210/512.1 |
| 5,021,165 | 6/1991 | Kalnino | 210/202 |
| 5,064,531 | 11/1991 | Wang | 210/202 |
| 5,068,031 | 11/1991 | Wang | 210/202 |
| 5,069,783 | 12/1991 | Wang | 210/202 |
| 5,080,802 | 1/1992 | Cairo | 210/221.2 |
| 5,084,165 | 1/1992 | Sang | 210/202 |
| 5,100,546 | 3/1992 | Broussard | 210/202 |
| 5,158,678 | 10/1992 | Broussard | 210/202 |
| 5,167,806 | 12/1992 | Wang | 210/202 |
| 5,202,026 | 4/1993 | Lema | 210/512.1 |

FOREIGN PATENT DOCUMENTS

| | | | |
|---|---|---|---|
| 1143437 | 3/1985 | U.S.S.R. | 210/703 |
| 119117 | 11/1985 | U.S.S.R. | 210/512.2 |
| 1306604 | 4/1987 | U.S.S.R. | 210/256 |
| 1416443 | 8/1988 | U.S.S.R. | 210/512.2 |
| 1421709 | 9/1988 | U.S.S.R. | 210/512.2 |
| 1535578 | 1/1990 | U.S.S.R. | 210/202 |

Primary Examiner—Thomas M. Lithgow
Attorney, Agent, or Firm—George A. Bode

[57] ABSTRACT

An apparatus and method for clarifying a contaminated fluid comprising a separator vessel having therein a cyclonic flow chamber; a spiral preliminary separator introduces the contaminated fluid to be separated into the cyclonic flow chamber by a tangential inlet so as to establish a swirling body of fluid; the cyclonic flow chamber has concentric shells positioned below the tangential inlet for discharging separated solids to a collection area and separating an oil and water mixture into a fluid flow zone formed by the cyclonic flow chamber and the wall of the separator vessel wherein water and oil are separated by aeration provided by eductors; a vertical outlet port discharges separated oil and gas from the upper portion of the cyclonic flow chamber to a fluid flow zone wherein oil and gas are separated. The separated water, oil, gas and solids are removed through discharge ports.

6 Claims, 7 Drawing Sheets

WATER CLARIFICATION METHOD AND APPARATUS

This application is a continuation-in-part application of a previous application by the same inventor bearing U.S. Ser. No. 07/965,888 filed Oct. 23, 1992, which is a continuation application of U.S. Ser. No. 07/589,471 filed Sep. 28, 1990, now U.S. pat. No. 5,158,678 issued Oct. 27, 1992. The entirety previous applications Ser. No. 07/965,888 filed Oct. 23, 1992, which is a continuation application of U.S. Ser. No. 07/589,471 filed Sep. 28, 1990, now U.S. Pat. No. 5,158,678 issued Oct. 27, 1992, is incorporated herein by reference as if set forth in full below.

BACKGROUND OF THE INVENTION

1. Field of the Invention

The present invention pertains to a method and apparatus for separation of suspended matter from a liquid. The method and apparatus more specifically applies to a system wherein the separation is accomplished in a vertical single cell vessel by an internal hydrocyclone or cyclonic separator for solids and aeration through a number of eductors which cause coalescing and separation of the remaining suspended matter from the water.

2. General Background

Oil/water and solid separators have been widely used in the oil and gas industry, and in pulp and paper mills, municipal waste treatment facilities, steel mills, food processing plants and electricity generating plants. There is thus an ever present and growing problem of contaminated waste water as a by-product of these various processes, and in particular, water produced in the production of oil and gas wells as well as waste water in the refinement process. Air/gas floatation is the method most commonly used to separate suspended material and oil from water and other liquids. Three basic types of air/gas floatation systems exist: dissolved air or gas; rotor-type disbursed air or gas; and, eductor-type disbursed air or gas systems. The hydrocyclone method also has been applied to the separation of suspended matter from liquids. A typical version of the single cell assembly is disclosed in U.S. Pat. No. 3,986,954 issued to George, et al. This assembly incorporates a single, horizontal, U-shaped tank through which the fluid to be treated is passed. A gas stream is injected into this tank and percolates through the fluid while the pressure of the fluid is increased. After such pressure is released, the gas breaks out of solutions and attaches itself to any contaminants in the fluid, thereby separating these contaminants from the fluid.

A simplified vertical single cell assembly is disclosed in U.S. Pat. No. 5,080,802 to Cairo, Jr., et al. This assembly incorporates a vertical vessel with an internal riser tube which contains additional coalescing means installed therein through which the fluid to be treated is passed. The riser tubes are in open communication with the fluid at or below the surface. An externally mounted eductor system is used along with a static mixing chamber to mix the contaminated liquid influent and a gas injected into the stream by the eductor before the mixture is released into the internal tube section of the vessel.

Yet another system disclosed in U.S. Pat. No. 4,255,262 to O'Cheskey provides an apparatus which mixes and disburses gas in the form of fine bubbles and liquid in a tank in an attempt to remove contaminants from the liquid flow into the tank. The gas induced from an upper section of the tank downwardly into the liquid in the tank via a draft tube. The gas induction occurs as a part of the liquid contained in the vessel is recycled back through the individual cells or compartments using a centrifugal pump. The apparatus uses a mechanical skimmer assembly which serves to remove contaminated froth accumulated on the surface of the liquid in the tank.

SUMMARY OF THE PRESENT INVENTION

The apparatus and method of the present invention provide a system which solves the aforementioned problems associated with clarifying contaminated liquids with a high solid and high oil content. What the present invention provides is a system which does not rely on induced air/gas floatation separation alone, but incorporates a cyclonic separator to separate, by the force of gravity, the solids and oil from the contaminated fluid on the inlet of the separator. The first portion or stage of the system utilizes a spiral separation coalescer (SPIRALSEP) provided to increase the micron size of the contaminated particles entering the inlet piping. The coalesced fluid then flows into the hydrocyclone which is provided for the removal of solids form the water by centrifugal force to separate contaminants by density or simulated gravity to separate the oil as well as the influent liquid. The solids are retained in a cone section for ease of removal as well as to prevent the solids from plugging the optional horizontal pack or filter section. Oil will exit at the top of the cyclonic separator through an orifice which controls the upward flow and forces a large portion of the fluid to exit the bottom of the cyclonic separator. The second portion or stage of the system utilizes multi-stage aerating means or eductors that aerates the fluid with micro-fine bubbles as it flows down through the vessel. A third portion or stage, which is optional, is a coalescer or pack section or filter medium positioned above the aerators and below the exit at the top of the cyclonic separator to pretreat the oil remaining in the fluid before introduction of the fine bubbles by eductors, Upon completion of the fluids journey through the three portion or stages of the system, the fluid is supplied to a recycle or reflux line to provide aeration by a connection located in the lower section of the vessel. The remaining fluid is discharged from the vertical separator vessel.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 2:
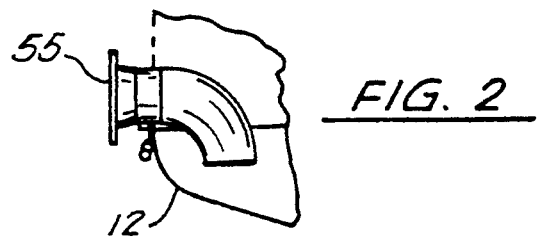
FIG. 2 is an enlarged elevational view of the cleansed water discharge outlet of the embodiment of FIG. 1.

Referring now to the drawing, and in particular FIGS. 1, 3, 4 and 17, the apparatus of the present invention is designated generally by the numeral 10.

The apparatus of the present invention 10 is generally described as a vertical oil/water/solid separator vessel 12 with a hydrocyclone or cyclonic separator 14 provided therein and a single cell floatation area 15,17 and multiple eductors 52 as an aeration means.

Figure 7:
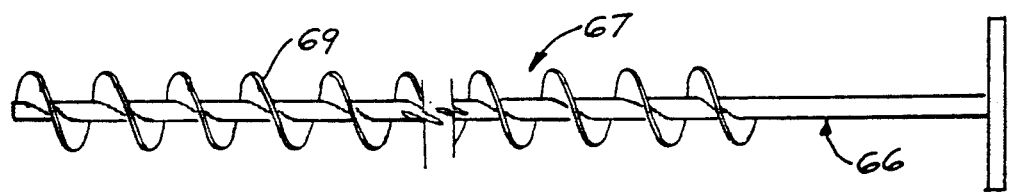
FIG. 7 is an elevational view of the central shaft mounted spiral blades or auger of the SPIRALSEP of FIG. 6.
Figure 6:
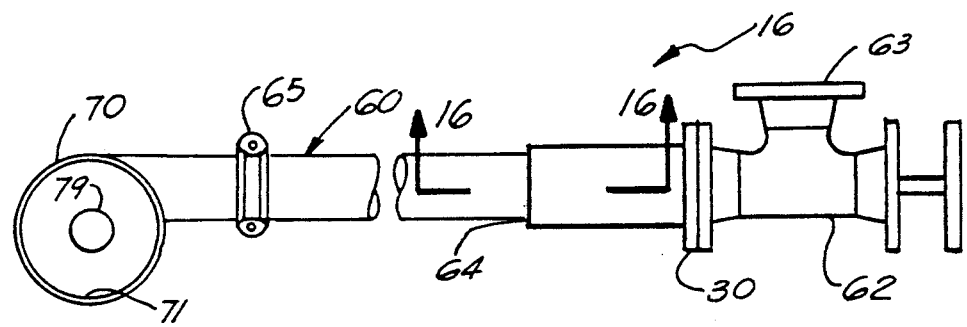
FIG. 6 is an enlarged view of the "SPIRALSEP" of the embodiment of FIG. 1.

The contaminated fluid to be separated enters separator vessel 12 via by inlet piping (not shown) connected at inlet 30 which extends into the vessel 12 and attaches tangentially to the cyclonic separator 14. Connected to inlet 30 interiorly of vessel 12 is preliminary separator or coalescer 16 (previously identified as a "SPIRAL-SEP" in my earlier co-pending application Ser. No. 07/965,888), best seen in FIGS. 6 and 7, which begins the separation process while fluid is still within pipeline 60 and before it enters hydrocyclone 14. SPIRALSEP 16 operates much the same as a stationary screw conveyor or auger 67 in that it includes a central shaft 66 having spiral blades 69 fixedly secured thereto. The shaft 66 and blades 69 do not rotate. As contaminated liquid is forced into piping 60 at inlet 30 it is forced to spin about the central axis of pipe 60 defined by the shaft 66, thus separating the oil and vapor from the contaminated liquid owing to the different densities and centrifugal force created. Thus, oil and vapor are driven toward the center of curvature or axis of rotation. Thus, the solids and the liquids that constitute the contaminated mixture are physically forced along piping 60 so as to prevent sludge from collecting and/or settling within this piping 60. Additionally, this movement along pipe 60 breaks up any large solids into smaller particles for better separation within hydrocyclone 14 and vessel chamber section 15, 17. This rotation about shaft 66 in pipe 60 also separates the contaminants from the fluid by centrifugal force. Furthermore, SPIRAL-SEP 16 utilizes entrained gas bubbles to scrub this incoming fluid, thereby creating an immediate frothing action within piping 60 and hydrocyclone 14. This initial frothing action permits the separation process within cyclonic separator 14 to be more efficient, thereby reducing the load on hydrocyclone 14.

Hydrocyclone 14 operates as a separator that uses pressure energy to generate high centrifugal forces for instantaneous separation of contaminated liquids which includes solids, oil and water. The device is a centrifugal separator with no moving parts. Hydrocyclone separator 14 has a high efficiency, is lightweight, compact in size and has high turn-up and turn-down ratios and insensitivity to rolling motion. Hydrocyclone 14 is designed to provide, over a wide range of pressure drops and flow rates, peak efficiency of greater than 6.5:1. The apparatus of the present invention 10 can use two different types of cyclones depending upon the operating condition. First, the "high efficiency" cyclone which is characterized by relatively small inlet diameter (point "P" of FIG. 20) and small diameter oil/gas orifices 34, 790 with a long body which gives high recovery; secondly, a "high rate" design gives medium recovery, but offers low resistance to flow so that a cyclone of a given size will have a much higher liquid capacity than a high efficiency design of the same body diameter. The high rate cyclones will have a large diameter inlet 30 and large diameter oil/gas orifices 34, 79 with a much shorter body.

Hydrocyclone 14 has a tangential entry at point "P" to spin the incoming liquid in the annular space 74 between the outer wall of inner core 71 and the inner wall of outer core 72 (best shown in FIGS. 4, 5, 17 and 20). This is designed to increase the velocity of the fluid which allows hydrocyclone 14 to separate the oil and vapor from the contaminated fluid due to the different densities and centrifugal force created. Thus, oil and vapor are driven toward the outer wall of inner core 71 due to the counter-clockwise rotation around inner core 71 about its axis, best shown by ARROWS B in FIG. 20. Thus, the solids and liquids constituting the contaminated mixture are physically forced along the interior wall of outer core 70 of cyclonic separator 14. The opening 75 at the bottom of cyclone 14 is a control means to hold the back pressure on cyclone 14 so as to allow some of the flow through the top orifice 79 of cyclone 14 which will allow gas vapors, oil and some water to exit. The gas, oil and water that exits the top of the cyclone 14 at outlet 79 is directed above the liquid surface "L" by discharge nozzle or elbow 179 (best seen in FIG. 17). This allows gas vapor to flow out of cyclone vessel 14 without effecting the surface level "L" of the liquid. The oil and water which has flowed out of the top of the cyclone 14 (via outlet 79 and nozzle 179) will fall back to the surface level of the liquid "L" with some of the oil (in a thin layer) remaining on the surface "S" for later skimming and the water (with some oil droplets therein) will travel downwardly for further cleansing to be discussed further hereinbelow and eventually to exit with the rest of the water at bottom exit 55 of vessel 12.

The bottom discharge 75 of the cyclone 14 will remove substantially all of the solid and most of the water. The solids will settle into the cone area 135 of sand hopper 72 and collect at bottom portion 139 and can be removed through discharge outlet 39 located at the bottom of center core or vessel 72. Water will travel upwardly (ARROWS H in FIG. 17) and will flow over the top of the center core 72 then travel to the bottom of separator vessel 12.

Figure 1:
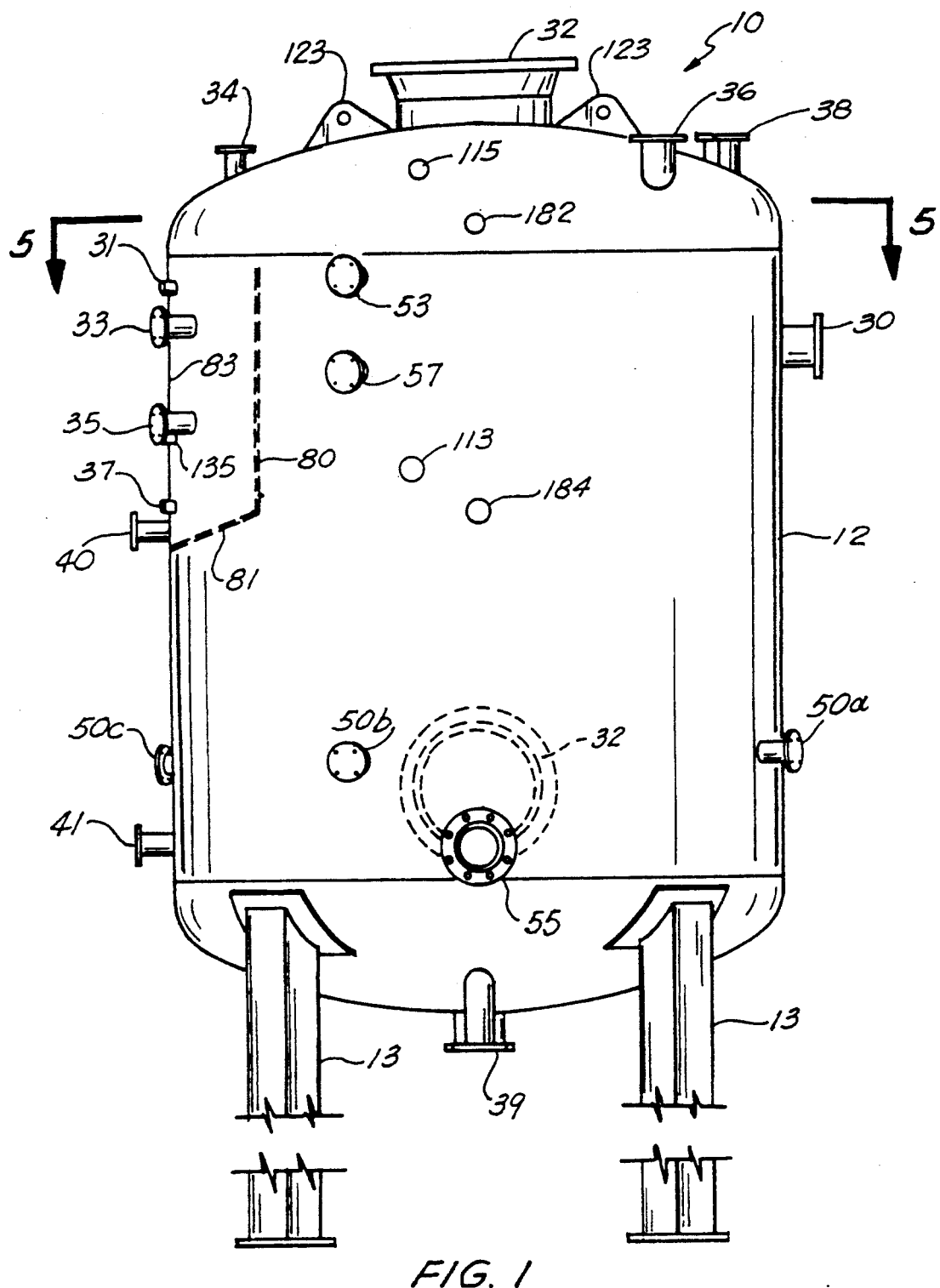
FIG. 1 is a front elevational view of the preferred embodiment of the apparatus of the present invention.
Figure 3:
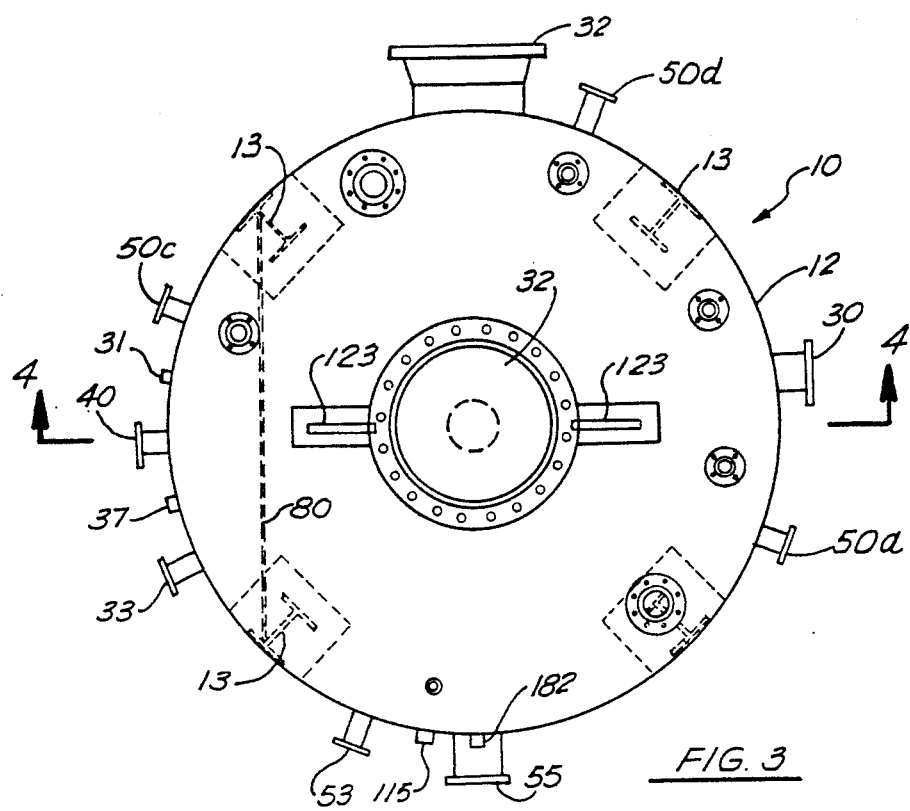
FIG. 3 is a top plan view of the embodiment of FIG. 1.
Figure 4:
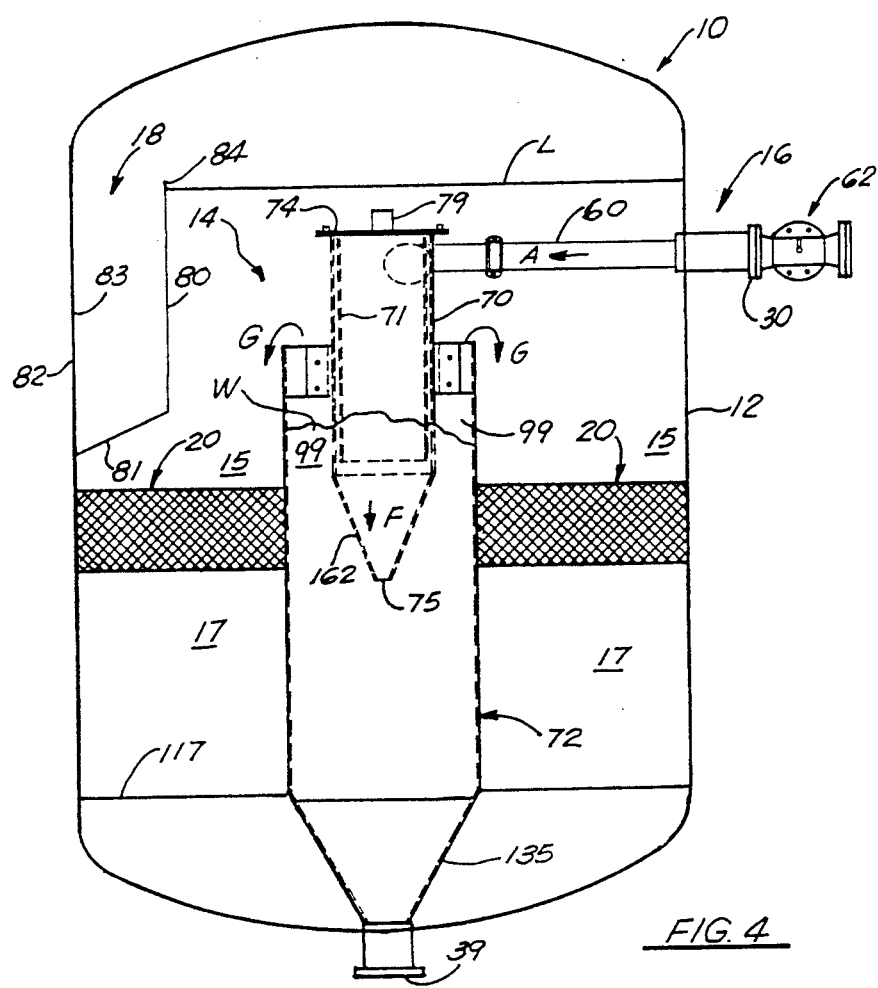
FIG. 4 is a sectional view, with some detail removed, taken along the LINES 4—4 of FIG. 3.
Figure 12:
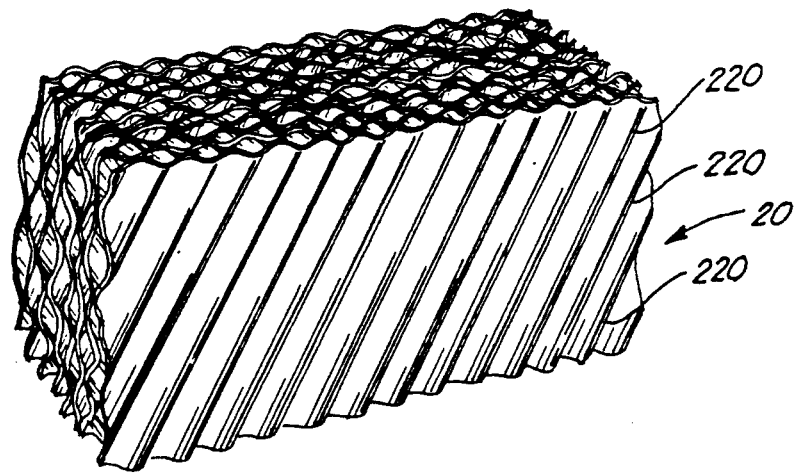
FIG. 12 is a top perspective view of the pack section of the embodiment of FIGS. 1 and 4.
Figure 14:
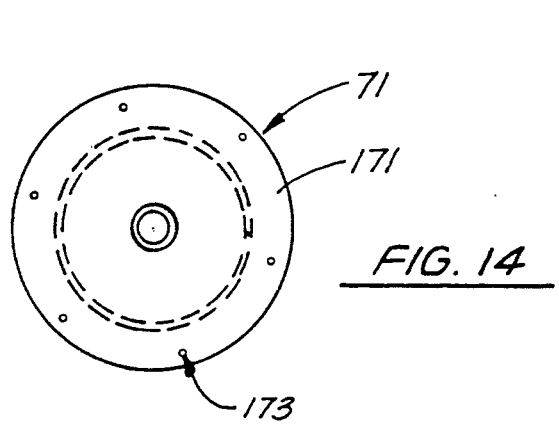
FIG. 14 is a top plane view of the inner core of FIG. 13.
Figure 13:
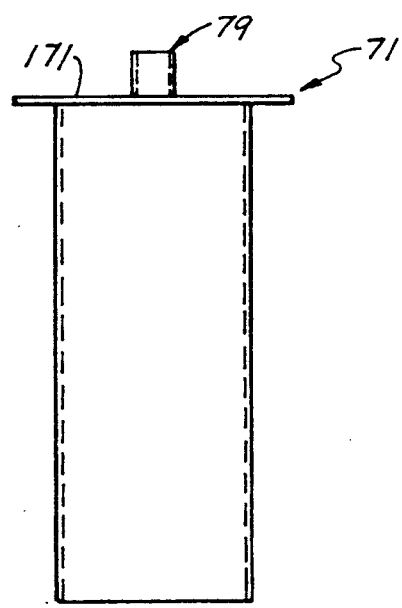
FIG. 13 is an elevational view of the inner core of the apparatus of the present invention.
Figure 17:
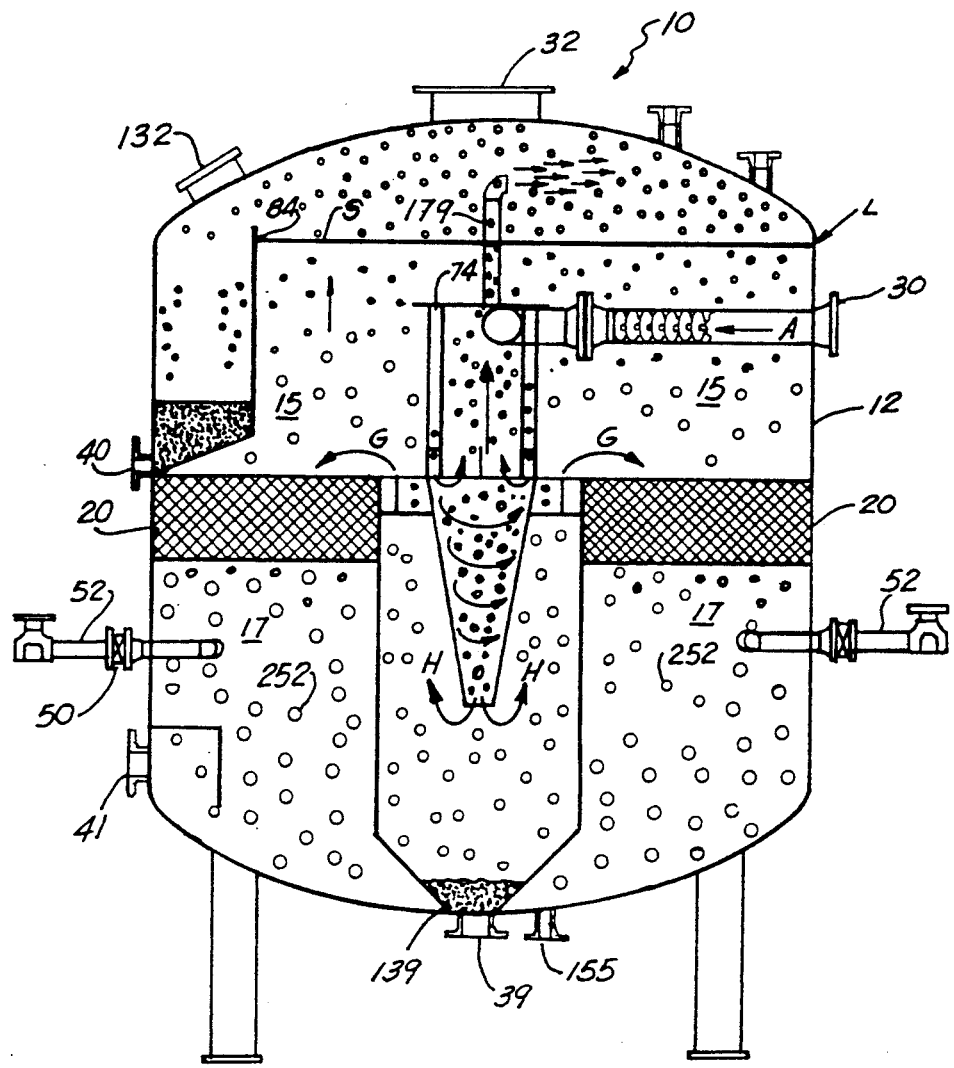
FIG. 17 is a sectional view of the embodiment of FIG. 1, with some detail removed, illustrating its operation and method.
Figure 19:
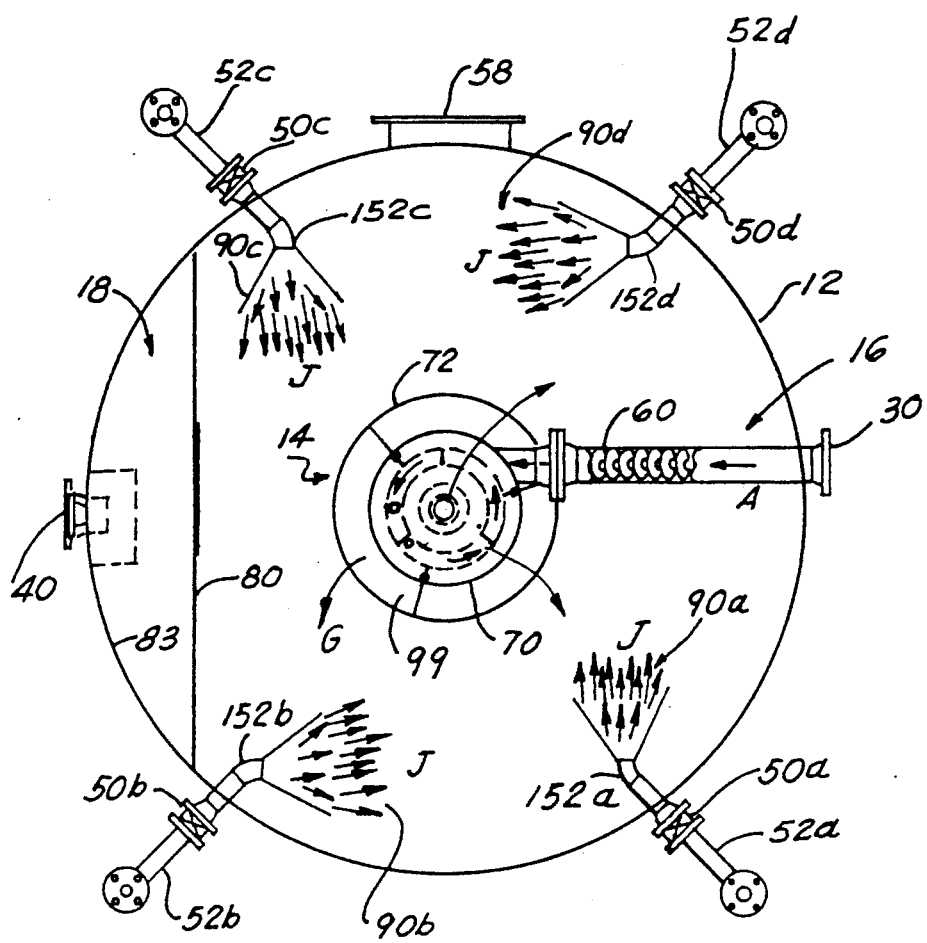
FIG. 19 is a sectional view, with some detail removed, taken along LINES 5—5 of FIG. 1 illustrating the operation and method of the preferred embodiment; and, FIG. 20 is an enlarged partial view of the cyclonic separator of FIG. 19.

The eductor system 52, best seen in FIGS. 3 and 19, will introduce micro-fine bubbles 252 into the water flowing downwardly in vessel sections 15 and 17 of vessel 12 to attach to the remaining oil droplets and to lift them to the surface "S" for eventual skimming. Eductors 52 can be mounted on the top of the vessel 12 when the optional coalescer or pack section 20, best seen in FIGS. 4, 12 and 17 is not installed or, eductors 52 can be mounted near the bottom, as seen in FIGS. 1 and 3 (where they would be connected to inlets 50) and 17 and 19. When mounted at or near the top of vessel 12, eductors 52 will pull in the vapor from the top of the vessel, thus removing the need to pipe gas vapors to the eductors. When mounted externally near the bottom as best seen in the preferred embodiment of FIGS. 1 and 17, the gas vapors have to be externally piped back to the top of the vessel. When mounted near the bottom, each of the eductors 52a-52d will carry the liquid and bubbles 252 into vessel 12 by the forty-five (45°) degree elbow 152, best seen in FIG. 19, attached to the inside nozzle to direct the flow in a circular motion around the vessel 12. Further, the exit nipple (not shown) of elbow 152 is flattened to deliver a fan flow (as shown at 90 and by ARROWS J in FIG. 19) to fill the area of vessel section 17 between the outer wall of sand hopper 72 and the inner wall of the separator vessel 12. This has the effect of increasing the surface area of the bubbles 252 to flood the zone with the micro-fine bubbles 252 so as to contact the remaining oil droplets in vessel sections or areas 15 or 17 before it can exit the vessel. The number of eductors 52 will be controlled by the diameter of vessel 12 and by the annular space 74 between the inner and outer cores 71, 70 as well as the volume of liquid to be separated. In the preferred embodiment of FIG. 1, four (4) equally spaced eductors 52a-52d are employed. Vessel 12 can be built as a pressurized vessel or a non-pressurized vessel depending upon the requirements and need.

Oil/water separator vessels can be made available in a variety of diameter sizes as well as heights and handle from about 1000 BPD (30 GPM) up to 200,000 BPD (6,000 GPM) or more. Additionally, vessels can be reshaped to fit available space without sacrificing efficiency or performance.

Referring now to the drawing, and in particular FIGS. 1 and 3-5, for more specific detail, the apparatus of the present invention is designated generally by the numeral 10. The apparatus of the present invention 10 is generally described as a oil/water/solid separator having a main sealed separator vessel 12. Vessel 12 has provided therein a cyclonic separator 14; a preliminary spiral separator (or "SPIRALSEP") 16 for introducing fluid into the cyclonic separator 14 and, an oil reservoir or oil bucket 18 for accepting, holding and eventually discharging separated oil. Eductors 52 introduce microfine gas bubbles 252 into vessel 12. Additionally, a filter or pack section 20 separates and collects oil from water and gas bubbles passing therethrough.

The cleansed water, solids, oil and gas have various outlets from vessel 12. A plurality of eductors 52 introduce gas bubbles 252 into vessel 12 and cleansed water is recycled and provides a means for controlling the introduction of contaminated fluid at the preliminary separator 16.

As best seen in FIG. 1, eyelets 123 provide a means for lifting and transporting apparatus 10. Manways 32 allow access to the interior of vessel 12 for maintenance and repair. Gas discharge or vent 34, 38 are provided in the top of vessel 12. Sight glasses 31, 37, 182 and 184; and, water level controls 53, 57; and, oil level controls 33, 35; and, fluid level safety lows and highs 113 and 115; and, oil level safety low 135 are provided in the cylindrical wall of vessel 12.

Figure 5:
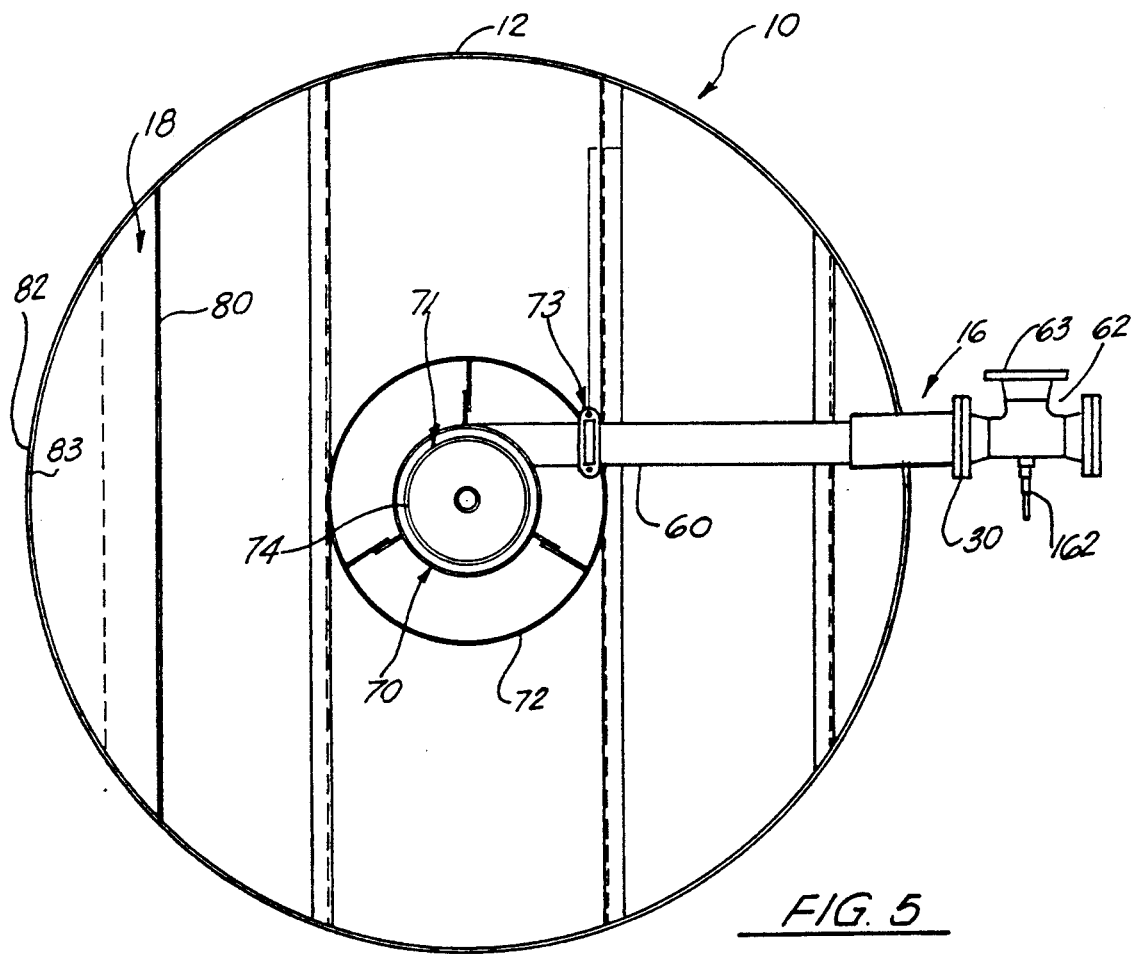
FIG. 5 is a sectional view, with the pack section and some other details removed, taken along LINES 5—5 of FIG. 1.
Figure 11:
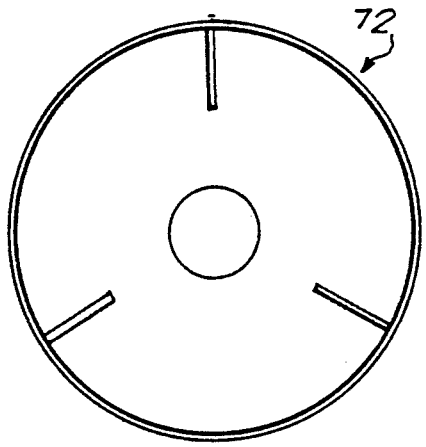
FIG. 11 is a top plan view of the sand hopper of FIG. 10.
Figure 9:
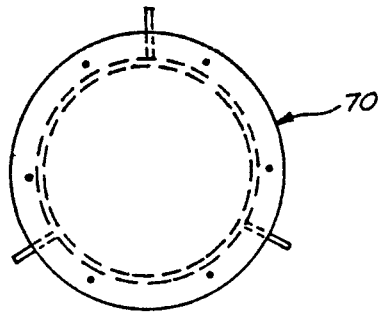
FIG. 9 is a top plan view of the outer core of FIG. 8.
Figure 8:
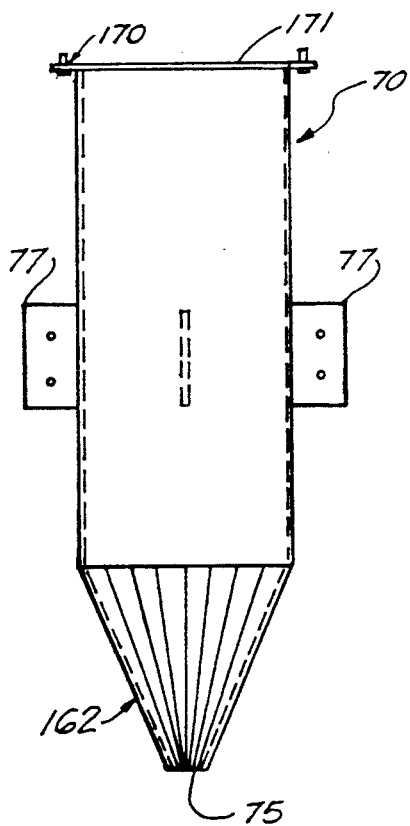
FIG. 8 is an elevational view of the outer core of the embodiment of FIG. 1.
Figure 10:
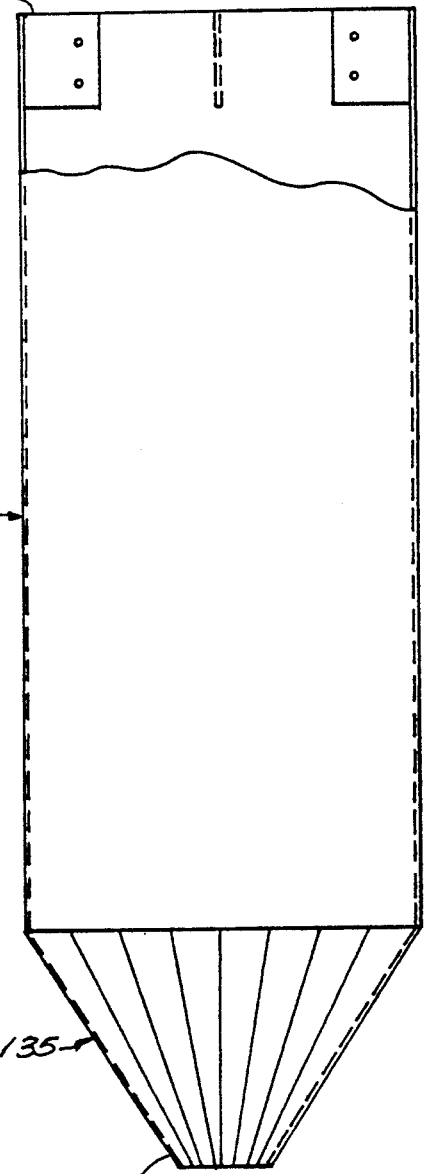
FIG. 10 is an elevational view of the sand hopper of the embodiment of FIG. 1.

As best seen in FIG. 1 and 4, vessel 12 is generally cylindrical in shape and is mounted vertically on conventional legs 13. Mounted about the central axis and internally of vessel 12 and of a substantially smaller diameter than vessel 12 is first shell or cylindrical vessel or sand hopper 72. Sand hopper 72, best seen in FIGS. 4, 8, 10 and 17, is tapered into a cone 135 at its lower portion 139 and communicates with solid trap and outlet 39 which will be discussed further herein. As best seen in FIGS. 3-5, concentrically mounted within vessel 72 is second shell or cylindrical vessel or outer core 70, best seen in FIGS. 4, 8, 9, 17 and 20. Outer core 70 has flanges 77 positioned about midway along its length to facilitate mounting to flanges 177 positioned on upper portion of the interior walls of sand hopper 72. Outer core 70 is of substantially the same shape as sand hopper 72 also being truncated into a cone 162 at its lower portion to form nozzle or discharge port 75. As best seen in FIG. 4, outer core 70 has a portion of its cylindrical body extending above the open upper end of sand hopper 72.

Mounted concentrically within outer core 70 is a third shell or cylindrical vessel or inner core 71 which is generally cylindrical in shape and is best seen in FIGS. 5, 13, 14, 17 and 20. Inner core 71 is of a slightly smaller diameter than outer core 70 to provide an annular space 74 therebetween for the cyclonic flow of contaminated fluid therein. Mounted to the top of inner core 71 is a lid or cap 171 which also fastens to outer core 70 by nuts 173 and bolts 170 in the manner best seen in the sectional view of FIG. 4 and in FIG. 14. A fluid outlet port 79 is provided in cap 171.

Figure 15:
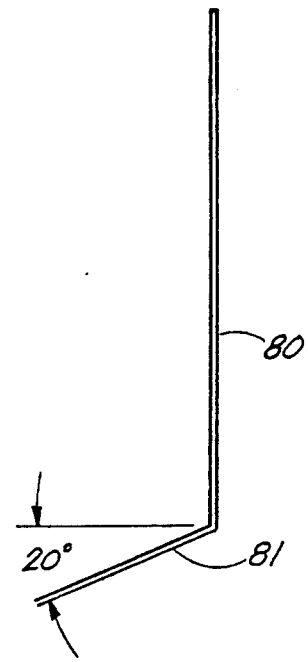
FIG. 15 is an elevational partial view of the oil bucket of the embodiment of FIG. 1.
Figure 18:
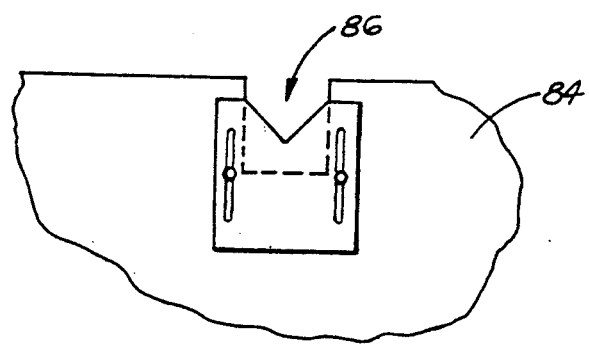
FIG. 18 is a pictorial view, partially broken away, of the weir of the embodiment of FIG. 1.

As best seen in FIGS. 1, 4 and 15, an oil reservoir or oil bucket 18 is provided in vessel 12 for accepting separated oil therein. Oil bucket 18 is comprised of the inner wall 83 formed from an upper portion 82 of vessel 12. Spaced from wall 83 is vertical plate 80 provided transversely of the interior of vessel 12, as best seen in FIGS. 3 and 5. Plate 80 is connected to interior wall portion 83 of vessel 12 by angulated plate 81 (in the preferred embodiment and, as best seen in FIG. 15, the angle is approximately twenty (20°) degrees sloping downwardly from the vertical). Thus, there is formed a closure or reservoir 18 open at the top formed by parallel walls 80 and 83 and angulated bottom 81. Mounted in the upper portion 84 of plate 80 is oil flow control means or weir 86, best seen in FIG. 18. Weir 86 is also disclosed in my prior applications Ser. No. 07/589,471 (now U.S. Pat. No.5,158,678) and No. 07/965,888 in FIG. 7 thereof. Weir 86 controls the flow of oil from surface "S" into oil reservoir 18. The oil then collects in the bottom of reservoir 18, as best shown in FIG. 17, and can hen be discharged by opening outlet 40.

As best seen in FIGS. 4, 5, 17, 19 and 20, there is tangentially connected to cyclonic separator means 14 preliminary separator (or SPIRALSEP) 16. SPIRAL- SEP 16 is disclosed in my prior applications mentioned in the paragraph immediately above.

Figure 16:
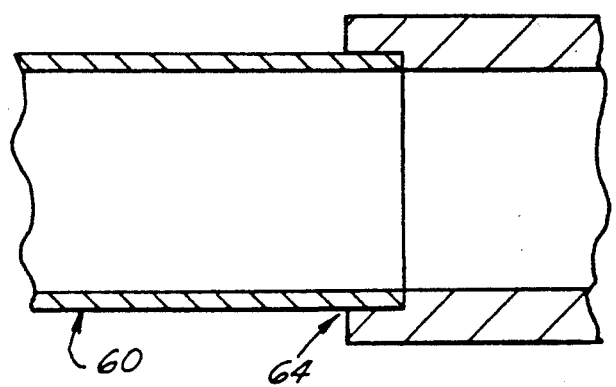
FIG. 16 is a sectional view taken along LINES 16—16 of FIG. 6.

As best seen in FIGS. 5, 6, 7, 19 and 20, SPIRALSEP 16 comprises an inlet T-section 62 having inlet port 63 for accepting contaminated fluid which is connected to inlet port 30 which is sealingly mounted in the wall of vessel 12. A control valve 162 controls the flow to inlet port 30. Piping 60 reduces in diameter at joint 64, as best seen in FIG. 16, as SPIRALSEP 16 invades vessel 12. A victaulic coupling 65 is mounted on pipe 60 as it approaches cyclonic separator 14. Pipe 60 is connected to the outer core 70 of cyclonic separator 14 tangentially, as best seen in FIGS. 5, 6, 19 and 20. In this way, fluid entering cyclonic separator 14 from SPIRALSEP 16, in the direction of ARROWS ∫A," follows the counter-clockwise path of ARROWS "B" in the annular space 74 between outer core 70 and inner core 71.

Figure 20:
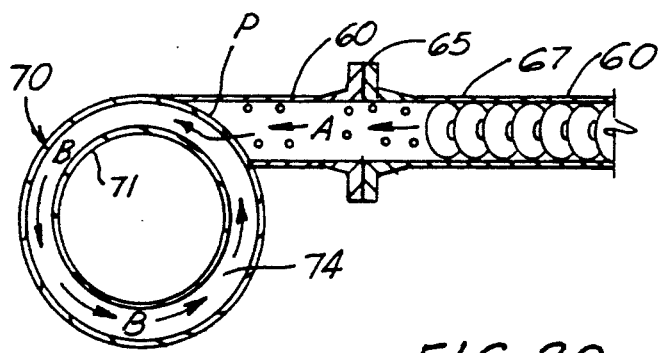

In operation and turning now to FIGS. 17, 19 and 20, contaminated fluid (water, oil, gas and solids) enters vessel 12 through inlet pipe 60 of SPIRALSEP 16. As the fluids travels in the direction of ARROWS "A" in pipe 60, the fluid passes over stationary auger 67 and due to the velocity of the fluid in the direction of ARROWS "A" and the centrifugal force, the fluid is separated so that the heavier solids and liquid (water with some oil droplets) coalesce near the inner walls of pipe 60 and the less dense oil and gas vapors favor the center of pipe 60. Fluid in pipe 60 eventually enters cyclonic separator 14 at aperture "P," best seen in FIG. 20, and is force to take the counterclockwise path illustrated by ARROWS "B" of FIG. 20 in the annular space 74 between outer and inner cores 70, 71. In this annular chamber 74, which extends through the vertical height of the common annular space 74 between outer and inner cores 70, 71, the centrifugal force, gravity and the density of the mixture cause the solids and the liquids (water with some oil droplets) to fall in the direction of ARROWS "F," best seen in FIG. 4, through the bit nozzle 75 of outer core 70 and into sand hopper 72, with the water level reaching "W" best seen in FIG. 3. Within the annular space 74, the oil and gas rise and are forced downwardly until they exit into the center of inner core 71 and exit cyclonic separator 14 through port and nozzle 79, 179. The oil exiting at port 79 and nozzle 179 will form a layer "S" on top of the water a level "L" within upper vessel section 15 of vessel 12. As the water level "L" rises in vessel 12, oil will eventually spill over the upper portion 84 of plate 80 through weir 86 into oil bucket 18. The flow of oil into oil bucket 18 is controlled by weir 84 as disclosed in my aforementioned earlier application.

Within annular space 99 between outer core 70 and sand hopper 72, best seen in FIGS. 4 and 19, the cleaner water (with some oil) spills over the top in the direction of ARROWS "G" into vessel section 15. This water and oil droplet mixture will, through gravity, fall through pack section 20 which comprises a filtering medium, best seen in FIG. 12, such as that sold under the trademark BIODEK ® and is a modular sheet-type medium with a cross-fluted structure creating numerous interconnecting channels 220 or redistribution points. The cross-fluted design allows for uniform redistribution of air or liquid within the packing media 20. It is manufactured, in its preferred embodiment, as polyvinylchloride (PVC) sheets and assembled into rigid self-supporting modules. As the water/oil mixture passes downwardly through pack section 20, the oil collects on the fluted channels 220 of pack section 20 and cleaner water passes therethrough into the lower portion 17 of vessel 12 between pack section 20 and weld seam 117. This cleaner water is removed through a discharge port 55 mounted in the lower portion of vessel 12 between pack section 20 and weld seam 117 under the power of a suction pump (not shown). Eductors 52 are connected to ports 50a–50d and are powered under a vacuum and introduce micro-fine gas bubbles 252 into chamber 17 of vessel 12 as best seen in FIG. 19. These bubbles 252 fan out at the nozzles 152 of eductors 52 within vessel section 17 of vessel 12 at an area indicated by 90 in FIG. 19 (the nozzles 152 of eductors 52 within vessel 12 are generally at a forty-five (45°) degree angle and have a fan-type tip to spray these bubbles 252 in the general pattern shown by 90).

In FIGS. 1 and 19, it can be seen that separated oil is removed from oil reservoir 18 at discharge port 40. Solid is removed from vessel 12 at solid discharge trap 39 connected to sand hopper 72 interiorly of vessel 12; clean water is removed from vessel 12 at clean water discharge 55; and, gas is relieved from vessel 12 at gas discharge 34. (Also, manways 32 are provided in the top and cylindrical side wall of vessel 12 to allow maintenance workers to enter the vessel to perform various maintenance functions and change out parts, such as nozzle 179).

A reflux or recycling of water is provided by water discharge at outlet 55 which is delivered to the same centrifugal suction pump (not shown) (this pump also powers eductors 52). This pump takes clean water from outlet 55 and/or optional auxiliary outlet 155 and introduces it as a reflux into pipe 60 at a control valve 162, best seen in FIG. 5. A conventional control valve 162 can be provided at this connection point to T-section 62 of pipe 60. At low flow conditions, the eductors 52 put reflux water into the flow in pipe 60 and maintain the speed of the cyclone in cyclonic separator 14. As the pressure builds on the incoming stream at inlet 63, the control or check valve 162 can seat and shut the flow off from the reflux pump because the vapor pressure prevents back flow to the vapor phase—this is important because the cyclone can't start and stop instantaneously.

In a manner similar to the water reflux, a gas reflux is provided from gas discharge 34 and powered by the same centrifugal suction pump (not shown). This gas reflux is provided to vessel 12 through eductors 52.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An apparatus for clarifying a contaminated fluid comprising:
   (a) a separator vessel having provided therein a cyclonic flow chamber means, said cyclonic flow chamber means including:
      (i) a first vertical cylindrical shell having an outlet at the bottom and being closed at the top; and,
      (ii) a second cylindrical shell concentrically positioned within said first shell, thereby providing an annular space therebetween, and having an outlet port at the top which extends outside of said first cylindrical shell and being open at the bottom;

(b) means for tangentially introducing said contaminated fluid to be separated into said annular space between said first and second shells so as to establish a swirling body of fluid therein;

(c) a third cylindrical shell annularly surrounding a lower portion of said first shell and extending below the outlet of the first shell, the upper portion of said third shell being positioned below said tangential introducing means;

(d) means for discharging a first separated fluid of said contaminated fluid into a first fluid flow zone in said separator vessel, said means for discharging comprising the upper portion of said third cylindrical shell and the lower portion of said first cylindrical shell, said first fluid flow zone being formed by the outer wall of said first shell and said separator vessel; and, (d) means for discharging a second separated fluid from said outlet port at the upper portion of said second shell to a second fluid flow zone located in the upper portion of the vessel.

2. The apparatus of claim 1, further comprising aeration means for introducing air into said first fluid flow zone.

3. The apparatus of claim 1 further comprising filtration means positioned intermediate said first and second fluid flow zones for collecting oil droplets from said first separated fluid as it passes therethrough.

4. An apparatus for clarifying a contaminated fluid comprising:

(a) a cylindrical separator vessel having provided therein a vertical cyclonic flow chamber means, said cyclonic flow chamber means including (i) a first vertical cylindrical shell closed at the top and having a lower truncated portion having an outlet at the bottom thereof; and, (ii) a second cylindrical shell concentrically positioned within said first shell, thereby providing an annular space therebetween, and being open at the bottom and having an outlet port at the top which passes through said first shell;

(b) means for tangentially introducing said contaminated fluid to be separated into said annular space between said first and second shells so as to establish a swirling body of fluid therein;

(c) a third cylindrical shell annularly surrounding a lower portion of said first shell and extending below the outlet of said first shell, the upper portion of said third shell being positioned below said tangential introducing means;

(d) means for discharging a first separated fluid of said contaminated fluid into a first fluid flow zone in said separator vessel, said means for discharging comprising the upper portion of said third cylindrical shell and the lower portion of said first cylindrical shell, said first fluid flow zone being formed by the outer wall of said first shell and said separator vessel; and, (e) means for discharging a second separated fluid from said outlet port at the upper portion of said second shell to a second fluid flow zone located in the upper portion of said vessel.

5. The apparatus of claim 4, further comprising aeration means for introducing air into said first fluid flow zone.

6. The apparatus of claim 4, further comprising filtration means positioned intermediate said first and second fluid flow zones for collecting oil droplets from said first separated fluid as it passes therethrough.

* * * * *